US012454858B1

(12) United States Patent
Loveday (10) Patent No.: US 12,454,858 B1
(45) Date of Patent: Oct. 28, 2025

(54) HANDGUN SAFE (71) Applicant: Anthony B Loveday, Lafollette, TN (US)

(72) Inventor: Anthony B Loveday, Lafollette, TN (US)

( * ) Notice: Subject to any disclaimer, the term of this patent is extended or adjusted under 35 U.S.C. 154(b) by 127 days.

(21) Appl. No.: 18/228,789

(22) Filed: Aug. 1, 2023

(51) Int. Cl.
*E05G 1/00* (2006.01)
*E05G 1/02* (2006.01)
*F41C 33/06* (2006.01)
*G07C 9/00* (2020.01)
*G07C 9/25* (2020.01)

(52) U.S. Cl.
CPC .............. *E05G 1/005* (2013.01); *E05G 1/02* (2013.01); *F41C 33/06* (2013.01); *G07C 9/00912* (2013.01); *G07C 9/25* (2020.01)

(58) Field of Classification Search
CPC .... E05G 1/00; E05G 1/02; E05G 1/04; E05G 1/005; F41C 33/00; F41C 33/02; F41C 33/06; G07C 9/00182; G07C 9/00912; G07C 2009/00206
See application file for complete search history.

(56) References Cited

U.S. PATENT DOCUMENTS

| 1,430,081 | A | 9/1922 | Holler | |
|---|---|---|---|---|
| 6,318,134 | B1* | 11/2001 | Mossberg | E05B 65/5292 292/144 |
| 6,570,501 | B2* | 5/2003 | Bushnell | E05B 47/0603 340/5.82 |
| 6,843,081 | B1* | 1/2005 | Painter | F41C 33/06 42/70.11 |
| 7,178,370 | B2* | 2/2007 | Engel | G07C 9/37 109/51 |
| 7,434,427 | B1 | 10/2008 | Miresmaili | |
| 8,186,188 | B1 | 5/2012 | Brown | |
| 9,218,699 | B1 | 12/2015 | McIntyre | |
| 9,340,163 | B2* | 5/2016 | Baker | B60R 7/14 |
| 9,500,441 | B2* | 11/2016 | Kirby, Jr. | F41C 33/06 |
| 9,530,266 | B2 | 12/2016 | Delattre | |
| 9,624,711 | B2* | 4/2017 | McAlexander | B65D 25/04 |
| 10,180,303 | B2* | 1/2019 | Gilbert | B65D 43/22 |
| 10,233,687 | B2* | 3/2019 | Delattre | E05G 1/005 |
| 10,253,529 | B1* | 4/2019 | McGinn | E05B 51/00 |
| 10,948,263 | B2* | 3/2021 | Mack | E05G 1/005 |
| 11,092,407 | B2* | 8/2021 | Bernkrant | F41C 33/0272 |
| 11,112,212 | B2* | 9/2021 | Hyde | E05B 65/0075 |
| D954,385 | S | 6/2022 | Zhu | |
| 12,018,912 | B2* | 6/2024 | Cosico | E05G 1/005 |
| 2011/0247950 | A1 | 10/2011 | McGee | |
| 2014/0116303 | A1* | 5/2014 | Mothersele | F41C 33/06 109/64 |

FOREIGN PATENT DOCUMENTS

WO     2009070499     6/2009

\* cited by examiner

*Primary Examiner* — Christopher J Boswell (57) ABSTRACT

The handgun safe forms a protected space that stores the firearm. The handgun safe includes a safe structure, a shock absorber structure, and a control circuit. The safe structure forms the exterior surfaces of the protected space formed by the handgun safe. The shock absorber structure mounts inside the safe structure. The control circuit mounts on the safe structure. The shock absorber structure rotates the safe structure between an open position and a closed position. The control circuit controls access into the protected space formed by the safe structure.

11 Claims, 7 Drawing Sheets

HANDGUN SAFE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of a safety box for carrying small firearms. (F41C33/06)

Summary of Invention

The handgun safe is a container. The handgun safe is configured for use with a firearm. This disclosure assumes, but does not require, that the firearm is a pistol. The handgun safe forms a protected space that stores the firearm. The handgun safe comprises a safe structure, a shock absorber structure, and a control circuit. The safe structure forms the exterior surfaces of the protected space formed by the handgun safe. The shock absorber structure mounts inside the safe structure. The control circuit mounts on the safe structure. The shock absorber structure rotates the safe structure between an open position and a closed position. The control circuit controls the operation of the shock absorber structure. The control circuit controls access into the protected space formed by the safe structure.

These together with additional objects, features and advantages of the handgun safe will be readily apparent to those of ordinary skill in the art upon reading the following detailed description of the presently preferred, but nonetheless illustrative, embodiments when taken in conjunction with the accompanying drawings.

In this respect, before explaining the current embodiments of the handgun safe in detail, it is to be understood that the handgun safe is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the handgun safe.

It is therefore important that the claims be regarded as including such equivalent construction insofar as they do not depart from the spirit and scope of the handgun safe. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
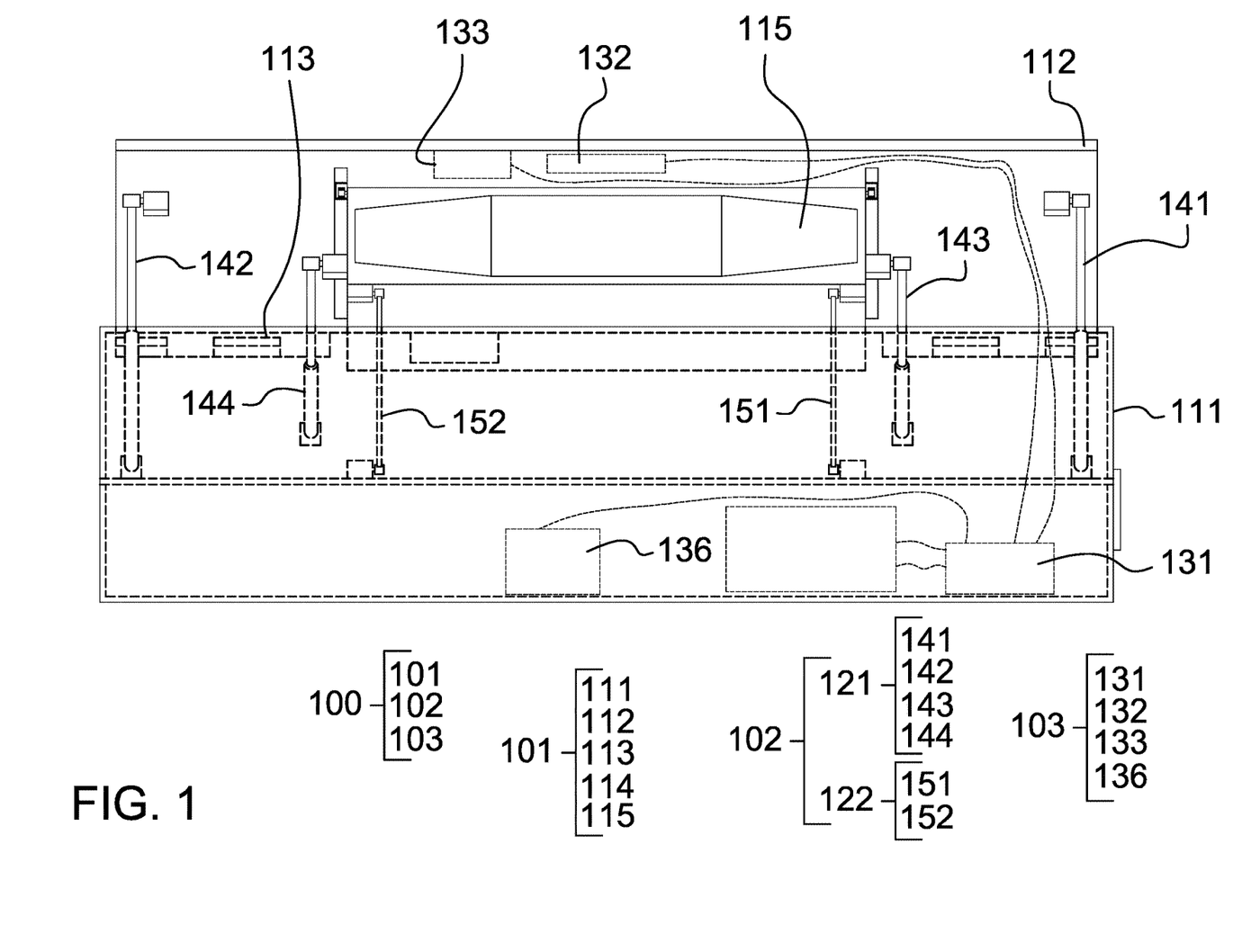
FIG. 1 is an anterior view of an embodiment of the disclosure.
Figure 2:
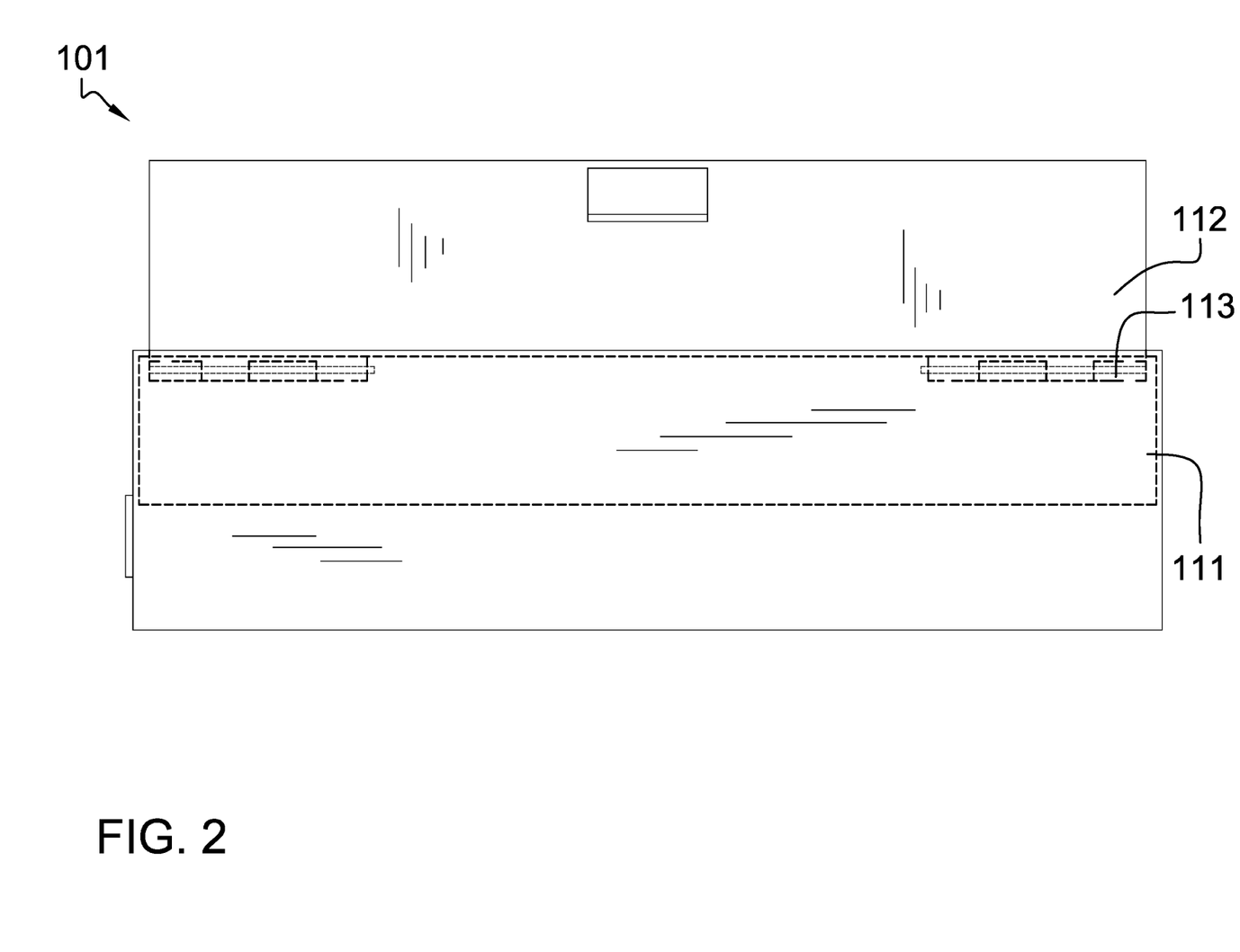
FIG. 2 is a posterior view of an embodiment of the disclosure.
Figure 3A:
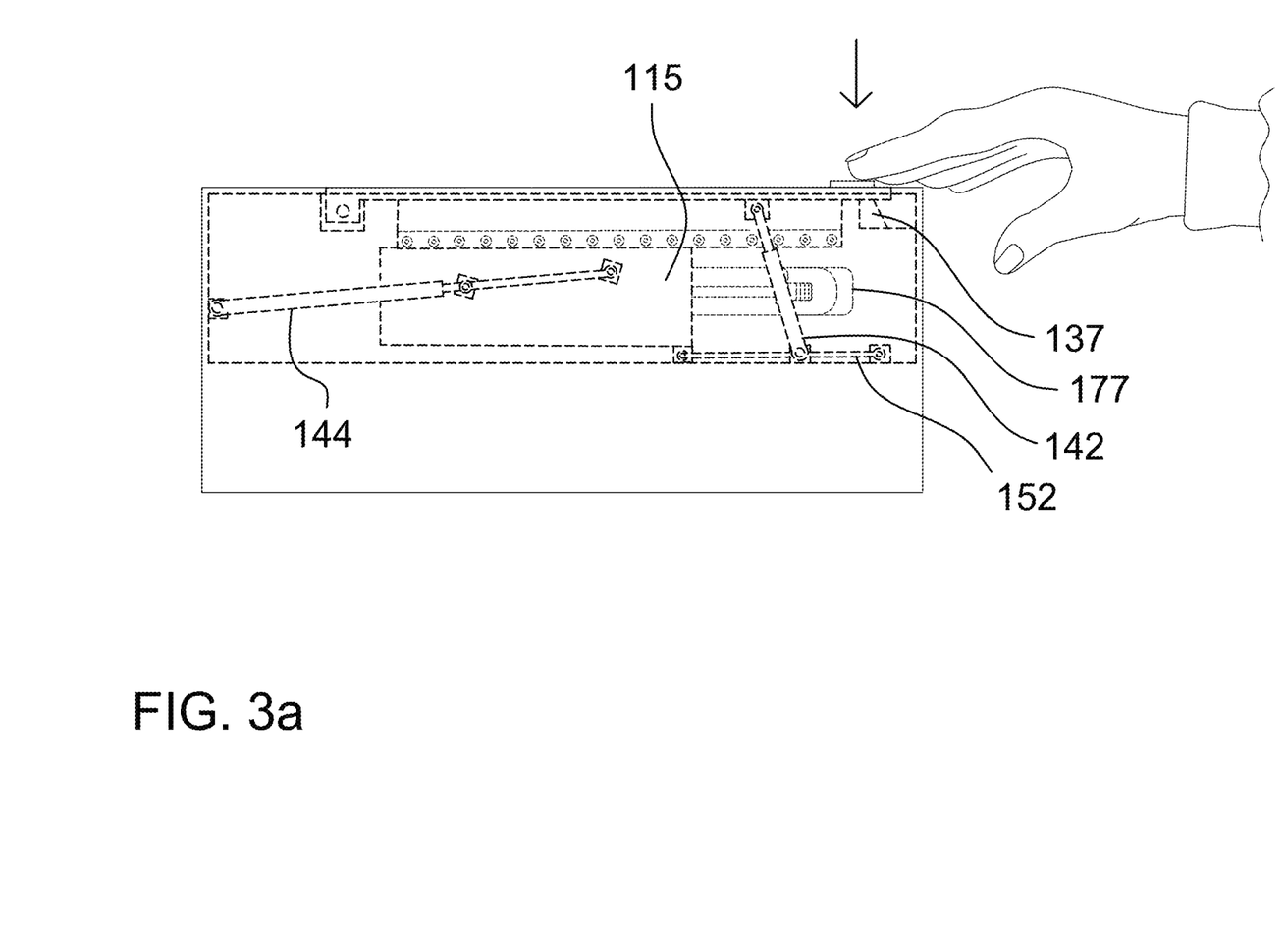
FIG. 3A is a lateral view of an embodiment of the disclosure.
Figure 3B:
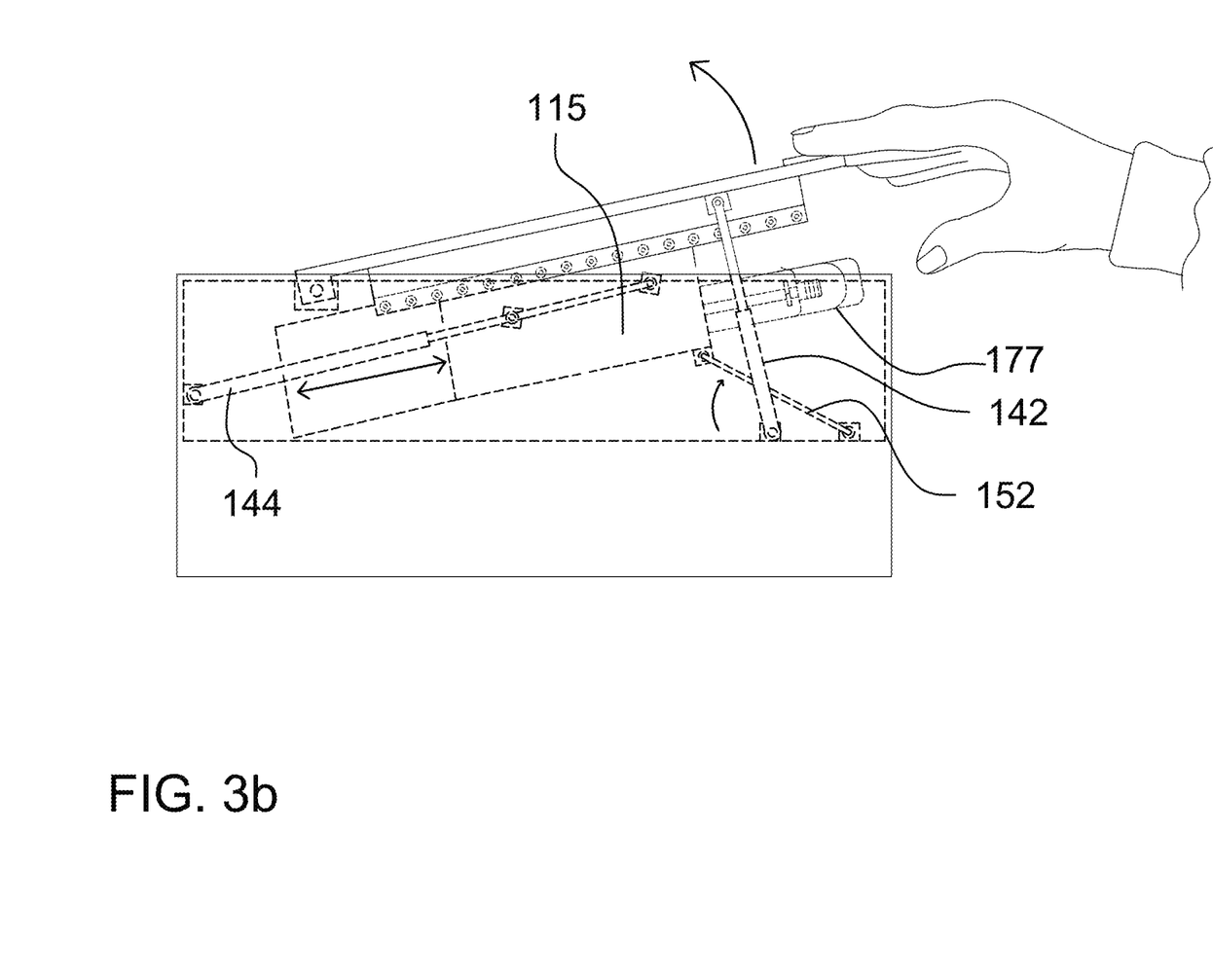
FIG. 3B is a lateral view of an embodiment of the disclosure.
Figure 3C:
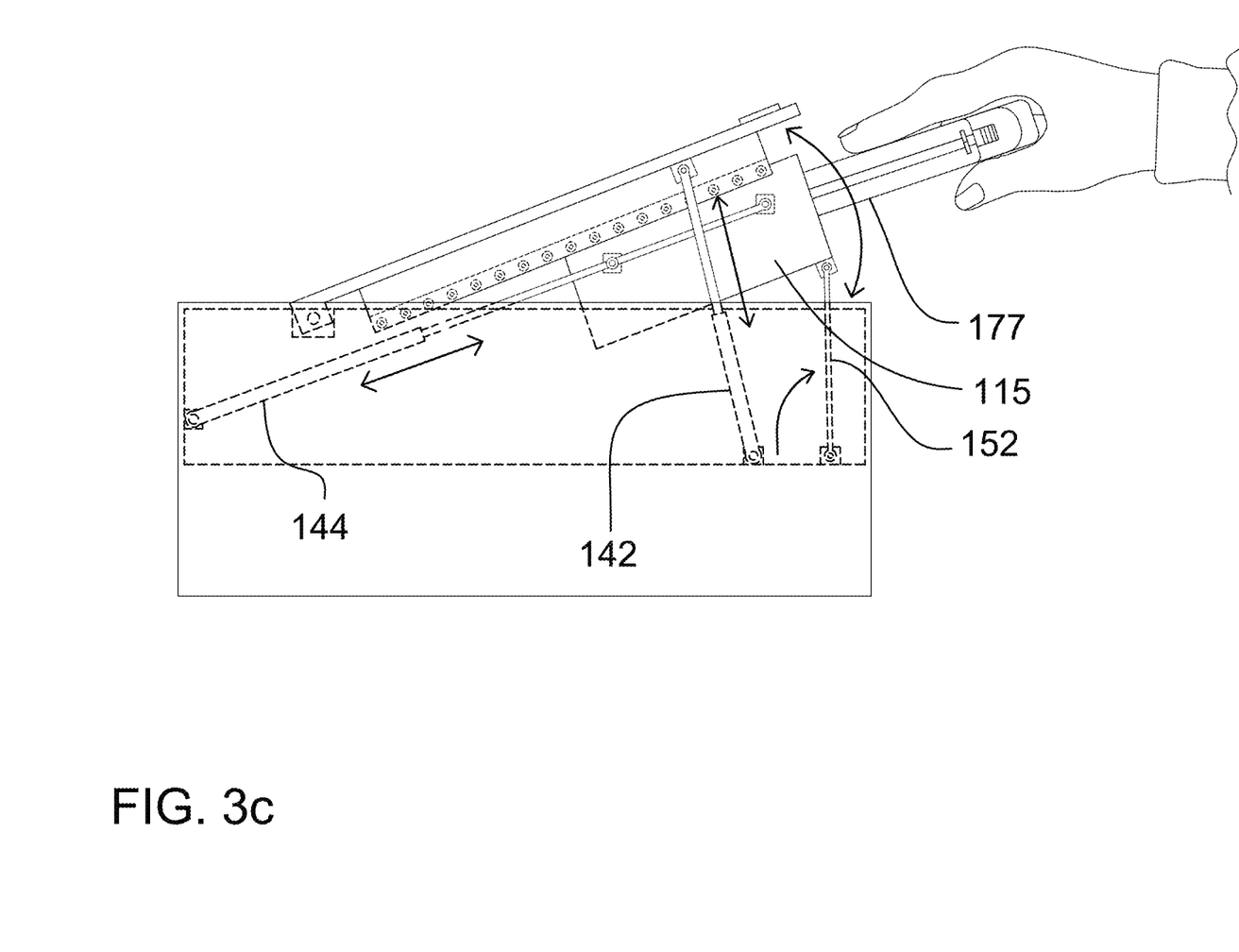
FIG. 3C is a lateral view of an embodiment of the disclosure.
Figure 4:
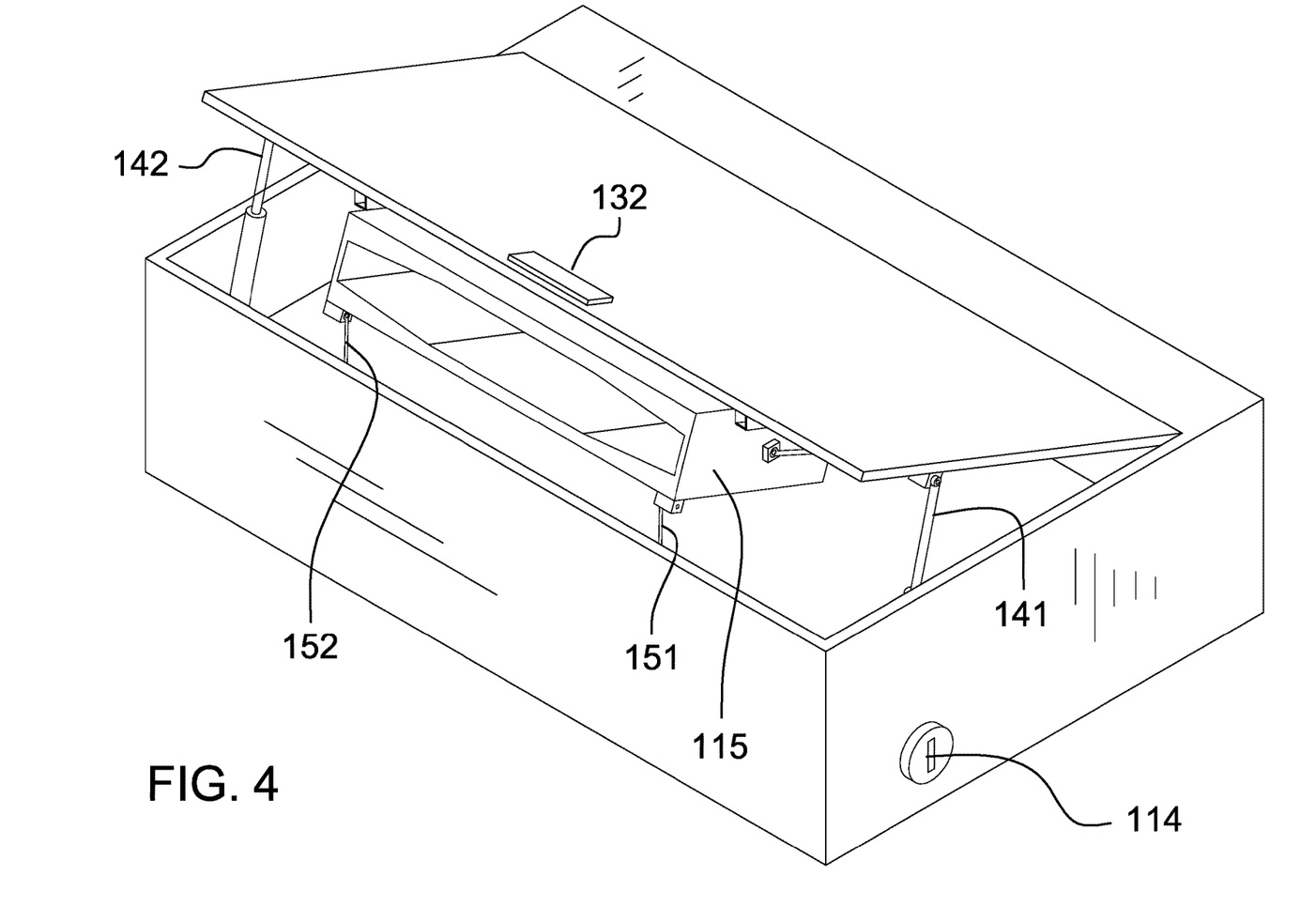
FIG. 4 is a perspective view of an embodiment of the disclosure.
Figure 5:
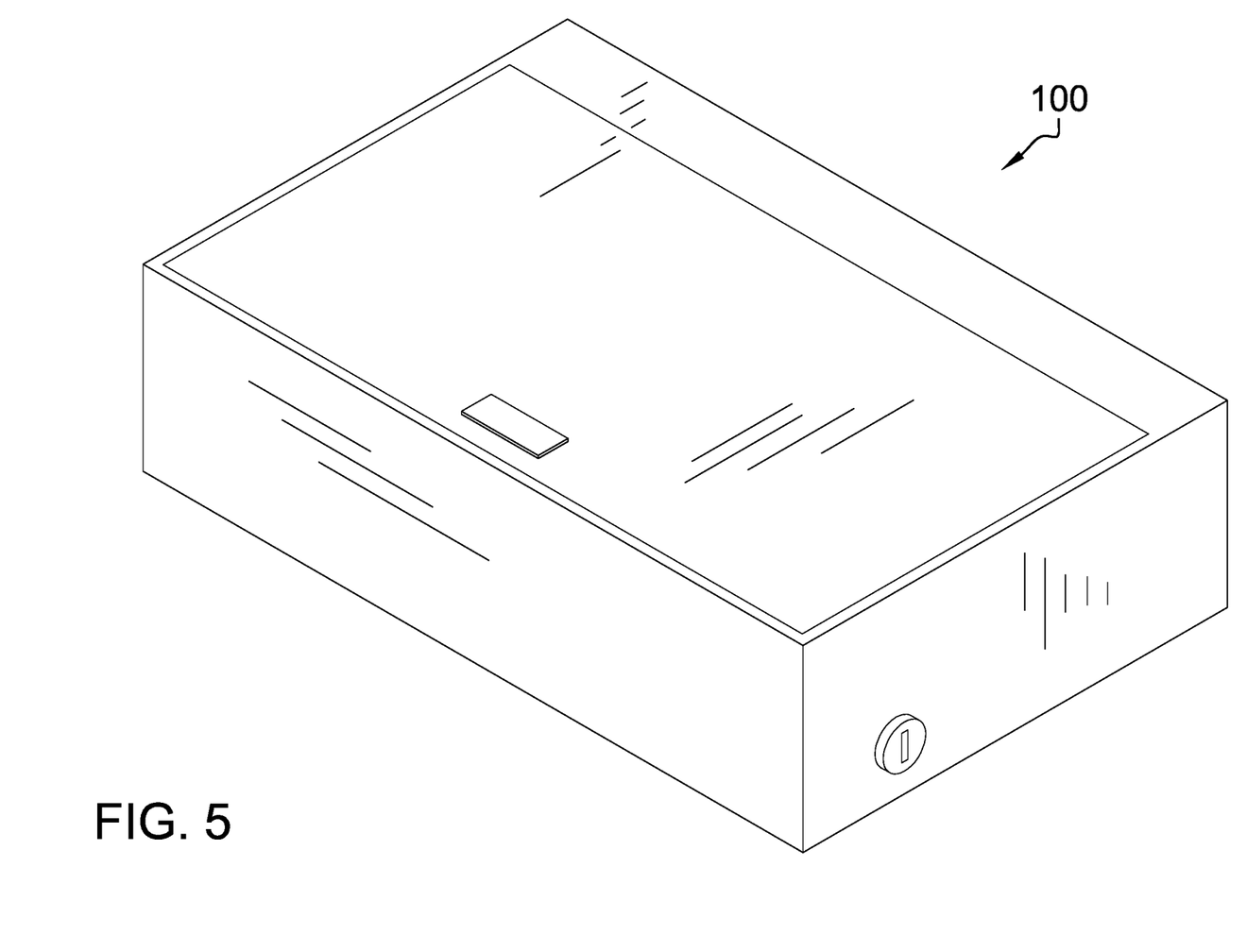
FIG. 5 is a perspective view of an embodiment of the disclosure.

Detailed reference will now be made to one or more potential embodiments of the disclosure, which are illustrated in FIGS. 1 through 5.

The handgun safe 100 (hereinafter invention) is a container. The invention 100 is configured for use with a firearm. This disclosure assumes, but does not require, that the firearm is a pistol. The invention 100 forms a protected space that stores the firearm. The invention 100 comprises a safe structure 101, a shock absorber structure 102, and a control circuit 103. The safe structure 101 forms the exterior surfaces of the protected space formed by the invention 100. The shock absorber structure 102 mounts inside the safe structure 101. The control circuit 103 mounts on the safe structure 101. The shock absorber structure 102 rotates the safe structure 101 between an open position and a closed position, and vice versa. The control circuit 103 controls the operation of the shock absorber structure 102. The control circuit 103 controls access into the protected space formed by the safe structure 101.

The safe structure 101 is a container. The safe structure 101 is a hollow structure. The safe structure 101 is a rigid structure. The safe structure 101 is a rotating structure. The safe structure 101 rotates between a closed position and the open position. The safe structure 101 forms the protected space of the invention 100. The safe structure 101 comprises a pan structure 111, a lid structure 112, a hinge structure 113, and a key lock structure 114.

The pan structure 111 forms a portion of the boundary of the protected space of the safe structure 101. The pan structure 111 is a prism shaped structure. The pan structure 111 is a hollow structure. The pan structure 111 is a pan shaped structure. The shock absorber structure 102 and a portion of the control circuit 103 are contained within the pan structure 111.

The lid structure 112 forms a portion of the boundary of the protected space of the safe structure 101. The lid structure 112 is a disk shaped structure. The lid structure 112 is geometrically similar to the open face of the pan structure 111. The lid structure 112 rotates relative to the pan structure 111. The lid structure 112 rotates between the closed position and the open position. In the closed position, the lid structure 112 encloses the open face of the pan structure 111 such that the protected space of the safe structure 101 is enclosed. In the open position, the lid structure 112 rotates away from the open face of the pan structure 111 such that the protected space of the safe structure 101 is accessible.

The hinge structure 113 is a fastening device. The hinge structure 113 is a rotating structure. The hinge structure 113 attaches the lid structure 112 to the pan structure 111 such that the lid structure 112 rotates relative to the pan structure 111. The axis of rotation of the lid structure 112 aligns with the axis of rotation of the hinge structure 113.

The key lock structure 114 is a mechanical lock. The hinge structure 113 fastens the pan structure 111 to the lid structure 112. The key lock structure 114 secures the lid structure 112 to the open face of the pan structure 111 when the lid structure 112 is in the closed position. The key lock structure 114 is secured and released using a key.

The lid structure 112 further comprises a holster structure 115. The holster structure 115 is a holster. The holster structure 115 is configured to store a firearm 177 within the protected space of the safe structure 101. The holster structure 115 permanently mounts on the interior surface of the disk structure of the pan structure 111. The holster structure 115 is fully contained and locked within the protected space of the safe structure 101 when the lid structure 112 rotates into the closed position. The holster structure 115 mounts on a holster track. The shock absorber structure 102 provides the motive forces that move the holster structure 115 along the holster track as the shock absorber structure 102 rotates the lid structure 112 between the open position and the closed position. The shock absorber structure 102 moves the holster structure 115 in the anterior direction as the lid structure 112 rotates into the open position.

The shock absorber structure 102 is a mechanical structure. The shock absorber structure 102 is hydraulically driven. The control circuit 103 controls the operation of the shock absorber structure 102. The shock absorber structure 102 provides the motive forces that rotate the lid structure 112 of the safe structure 101 into the open position. The shock absorber structure 102 provides the motive forces that rotate the lid structure 112 into the closed position. The shock absorber structure 102 is contained within the protected space formed by the safe structure 101. The shock absorber structure 102 comprises a plurality of shock absorbers 121 and a plurality of stabilizer bars 122. The plurality of shock absorbers 121 provide the motive forces necessary to rotate the lid structure 112 into the open position. The plurality of stabilizer bars 122 provide the motive forces that move the holster structure along the holster track as the lid structure 112 rotates into the open position.

Each shock absorber selected from the plurality of shock absorbers 121 is a hydraulic cylinder structure. Each selected shock absorber is a composite prism shaped structure. A first congruent end of the composite prism structure of each selected shock absorber permanently attaches to the interior surface of the pan structure 111. A second congruent end of the composite prism structure of each selected shock absorber permanently attaches to either the holster structure 115 or the interior surface of the lid structure 112.

Each selected shock absorber is under hydraulic pressure, which is released upon unlocking the invention 100 via the control circuit 103. Each selected shock absorber converts the received pressurized fluid into a motive force that rotates the lid structure 112 into the open position. The plurality of shock absorbers 121 combine to provide the motive forces that rotate the lid structure 112 of the safe structure 101 into the open position. The plurality of shock absorbers 121 combine to provide the motive forces that hold the lid structure 112 in the open position.

The plurality of shock absorbers 121 comprises an anterior left side shock absorber 141, an anterior right side shock absorber 142, a posterior left side shock absorber 143, and a posterior right side shock absorber 144.

The anterior left side shock absorber 141 is a shock absorber selected from the plurality of shock absorbers 121. The anterior left side shock absorber 141 provides a portion of the motive forces necessary to rotate the lid structure 112 into the open position. The first congruent end of the anterior left side shock absorber 141 attaches to the interior surface of the closed face of the pan structure 111. The second congruent end of the anterior left side shock absorber 141 attaches to the interior surface of the lid structure 112. The anterior left side shock absorber 141 is positioned at a location proximal to the anterior left side formed in the lateral face of the pan structure 111.

The anterior right side shock absorber 142 is a shock absorber selected from the plurality of shock absorbers 121. The anterior right side shock absorber 142 provides a portion of the motive forces necessary to rotate the lid structure 112 into the open position. The first congruent end of the anterior right side shock absorber 142 attaches to the interior surface of the closed face of the pan structure 111. The second congruent end of the anterior right side shock absorber 142 attaches to the interior surface of the lid structure 112. The anterior right side shock absorber 142 is positioned at a location proximal to the anterior right side formed in the lateral face of the pan structure 111.

The posterior left side shock absorber 143 is a shock absorber selected from the plurality of shock absorbers 121. The posterior left side shock absorber 143 provides a portion of the motive forces necessary to rotate the lid structure 112 into the open position. The first congruent end of the posterior left side shock absorber 143 attaches to the interior surface of the posterior lateral face of the pan structure 111. The second congruent end of the posterior left side shock absorber 143 attaches to the holster structure 115. The posterior left side shock absorber 143 is positioned at a location proximal to the posterior left side formed in the lateral face of the pan structure 111.

The posterior right side shock absorber 144 is a shock absorber selected from the plurality of shock absorbers 121. The posterior right side shock absorber 144 provides a portion of the motive forces necessary to rotate the lid structure 112 into the open position. The first congruent end of the posterior right side shock absorber 144 attaches to the interior surface of the posterior lateral face of the pan structure 111. The second congruent end of the posterior right side shock absorber 144 attaches to the holster structure 115. The posterior right side shock absorber 144 is positioned at a location proximal to the posterior right side formed in the lateral face of the pan structure 111.

Each stabilizer bar selected from the plurality of stabilizer bars 122 is a rigid prism shaped structure. A first congruent end of each selected stabilizer bar permanently attaches to the interior surface of the pan structure 111. The first congruent end of each selected stabilizer bar attaches to the surface of the holster structure 115 such that the selected stabilizer bar rotates relative to the pan structure 111. A second congruent end of each selected stabilizer bar permanently attaches to the holster structure 115. The second congruent end of each selected stabilizer bar attaches to the surface of the holster structure 115 such that the selected stabilizer bar rotates relative to the holster structure 115.

The rotations of the plurality of stabilizer bars 122 are established such that: a) the rotation of the lid structure 112 from the closed position to the open position pulls the holster structure 115 along the holster track in the anterior direction; and, b) the rotation of the lid structure 112 from the closed position to the open position pushes the holster structure 115 along the holster track in the posterior direction.

The plurality of stabilizer bars 122 comprises an anterior left side stabilizer bar 151 and an anterior right side stabilizer bar 152. The anterior left side stabilizer bar 151 is a stabilizer bar selected from the plurality of stabilizer bars 122. The anterior left side stabilizer bar 151 is positioned at a location proximal to the anterior left side formed in the lateral face of the pan structure 111.

The anterior right side stabilizer bar 152 is a stabilizer bar selected from the plurality of stabilizer bars 122. The anterior right side stabilizer bar 152 is positioned at a location proximal to the anterior right side formed in the lateral face of the pan structure 111.

The control circuit 103 is an electric circuit. The control circuit 103 locks the lid structure 112 into a closed position relative to the pan structure 111. The control circuit 103 is a biometric structure. By biometric structure is meant that the control circuit 103 performs a biometric scan on an individual trying to access the protected space of the safe structure 101. The control circuit 103 determines whether the performed biometric scan matches an individual authorized to access the protected space of the safe structure 101. The control circuit 103 allows appropriate access to the protected space of the safe structure 101.

The control circuit 103 controls the movement of the shock absorber structure 102 by unlocking the lid structure 112 with respect to the pan structure 111. The control circuit 103 releases the shock absorber structure 102 to actuate, and hold the lid structure 112 in the open position. To close the lid structure 112, an end user would push the holster structure 115 inwards along with the lid structure 112 to retract, and close the invention 100.

The control circuit 103 comprises a logic circuit 131, a fingerprint scanner 132, an electronic lock structure 133, a GPS module 136. The logic circuit 131, the fingerprint scanner 132, the electronic lock structure 133, the GPS module 136 are electrically interconnected.

The logic circuit 131 is an electric circuit. The logic circuit 131 controls the operation of the control circuit 103. The logic circuit 131 electrically connects to the fingerprint scanner 132. The logic circuit 131 monitors the operation of the fingerprint scanner 132. The logic circuit 131 electrically connects to the electronic lock structure 133. The logic circuit 131 controls the operation of the electronic lock structure 133.

The fingerprint scanner 132 is a security device. The fingerprint scanner 132 is a sensor that scans the fingerprint of an individual and codes the scan into an electrical signal. The fingerprint scanner 132: a) registers the fingerprint of the individual; b) stores the registered fingerprint of the individual; c) scans a fingerprint during the process of accessing the protected space of the safe structure 101; d) compares the scanned fingerprint to the registered fingerprint of the individual; and, 5) upon a fingerprint match sends a signal to the logic circuit 131 verifying the fingerprint match.

The electronic lock structure 133 is an electronic lock. The electronic lock structure 133 physically locks the lid structure 112 to the pan structure 111. The electronic lock structure 133 releases the lid structure 112 from the pan structure 111 on receipt of a release signal from the logic circuit 131. The logic circuit 131 transmits the release signal to the electronic lock structure 133 after the logic circuit 131 has received the fingerprint match signal.

The logic circuit 131 initiates the rotation of the lid structure 112 after the logic circuit 131 has transmitted the release signal to the electronic lock structure 133, which releases the lid structure 112. The lid structure 112 back into the closed position after the logic circuit 131 discontinues the generation of the motive forces.

The GPS module 136 is an electrical device that communicates with the GPS to determine the GPS coordinates of the GPS module 136. In the event that the invention 100 should go missing, the GPS module 136 transmits the GPS coordinates to an appropriate authority.

The following definitions were used in this disclosure:

Algorithm: As used in this disclosure, an algorithm is a previously defined procedure used to perform a specified task. A device that is capable of implementing an algorithm randomly selected from a plurality of algorithms is called a programmable device.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

At a Location Proximal to: As used in this disclosure, the term "at a location proximal to" identifies the position of an object selected from a group relative to an identified location such that the span of distance from the identified location and the selected object is less than the span of distance between the identified location and any object remaining in the group. Stated less formally, at a location proximal to means that the selected object is closer to the identified location than any other object selected from the group.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Biometric Device: As used in this disclosure, a biometric device is a security device that identifies an individual through the use of a unique and measurable physiological characteristic of the individual. Typical unique and measurable physiological characteristic include, but are not limited to, fingerprints, DNA, or retina of the eye.

Brink: As used in this disclosure, a brink refers to the edge or line formed by the intersection of a first plane or surface and a second plane or surface wherein a cant exists between the first plane or surface and the second plane or surface.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Closed Position: As used in this disclosure, a closed position refers to a movable barrier structure that is in an orientation that prevents passage through a port or an aperture. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Conflict: As used in this disclosure, a conflict refers to a plurality of entities where any first entity selected from the plurality of entities is attempting to achieve a first objective and any second entity selected from the plurality of entities is attempting to achieve a second objective. In a conflict, the achievement of the first objective is in some way incompatible with the achievement of the second objective. Examples of entities selected from plurality of entities include, but are not limited to, individual biological entities, organizations, and societies.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Coronal Direction: As used in this disclosure, the coronal direction (or axis) is a direction defined by the axis of an object that is perpendicular in the transverse (posterior to anterior) direction and the sagittal (superior to inferior) direction. The coronal direction is the direction that moves from a first lateral side of the object to the second lateral side of the object (Stated less formally: the direction from the left to the right).

Coronal Plane: As used in this disclosure, the coronal plane refers to a reference plane that bisects an anterior surface and posterior surface such that the coronal plane contains the line of the coronal direction and the line of the sagittal direction. The coronal plane is also referred to as the lateral plane. The coronal plane is perpendicular to the sagittal plane and the transverse plane.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal: As used in this disclosure, distal refers to a directional sense or location of an object. Specifically, distal refers to a first object, or a side of a first object, that is distal from the medial axis, or more proximal to the side of the object, relative to a second object, or side of a second object.

Electronic Lock: As used in this disclosure, an electronic lock is an electromechanically operated lock that: 1) mechanically locks an object; and, 2) is secured and released using an electrical or electronically driven mechanism.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Firearm: As used in this disclosure, a firearm is a handheld weapon designed to expel a projectile which has been accelerated using a mechanism comprising an explosion or an explosive decompression (referred to in this definition as explosive decompression). The combination of the projectile and the chemical compound required to generate the explosive decompression is called the ammunition. The primary components of a firearm comprises a barrel, a firing mechanism, a trigger, and a stock structure. The barrel is a tubular structure that guides the projectile out of the firearm after the explosive decompression has occurred. The firing mechanism: a) stores ammunition; b) loads the ammunition into the firing mechanism; c) initiates the explosive decompression that accelerates the projectile out of the barrel; and, d)

discharges unnecessary components from the firearm after the explosive decompression. The trigger is a lever that initiates the explosive decompression within the firing mechanism. A safety refers to a mechanical mechanism that prevents the operation of the trigger. The stock forms the structure on which the barrel, firing mechanism, and the trigger mount. On larger handheld firearms (commonly called rifles), the stock further comprises a forestock and a buttstock. On smaller handheld firearms (commonly called pistols) the stock is commonly called the grip.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Holster: As used in this disclosure, a holster is a storage pouch that attaches to an object such as a belt, a webbing, a sling, or a luggage item. The holster is dedicated to containing a previously identified object such that the previously identified object is readily accessible.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Key: As used in this disclosure, a key is a metal tool used to open and secure a lock. The working element of the key is a blade structure into which is cut a series of ridges and notches in a pattern customized for the lock that is paired for use with the key.

Lateral: As used in this disclosure, the term lateral refers to an axis of an object that is perpendicular in the transverse (posterior to anterior) direction and the sagittal (superior to inferior) direction. The distal surfaces of an object that intersect the lateral axis are often informally referred to as the "sides" of the object. The lateral axis is usually perpendicular to the primary sense of direction of the object. A lateral face refers to the surfaces of a prism structure that run between the congruent ends of the prism. Movement in a lateral direction is often called "sideways" movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that is released through the use of a key, a numeric or alphanumeric combination, or a biometric identification protocol.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is a programmable device.

Medial: As used in this disclosure, medial refers to a directional sense or location of an object. Specifically, medial refers to a first object or a side of a first object that is closer to the medial axis or more distal from the side of the object relative to a second object or side of a second object.

Medial Axis: As used in this disclosure, the medial axis is the center line of an object that is parallel to the sagittal direction. When two objects are compared relative to the medial axis, the object closer to the medial axis is referred to as the medial object and the object distal from the medial axis is referred to as the lateral object.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Piston: As used in this disclosure, a piston is a prism or disk that closely fits within a pipe or tube and that moves along the center axis of the pipe or tube. Depending on the context, a piston can also refer to the apparatus associated with the disk that allows the disk to move within the pipe or tube.

Posterior: As used in this disclosure, posterior is a term that is used to refer to the side of an object that is distal or in the opposite direction of the anterior side. When comparing two items, the posterior item is the item that is distal from the anterior of the object.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Sagittal Direction: As used in this disclosure, the sagittal direction runs from the superior surface to the inferior surface of an object and is perpendicular to the coronal direction and the transverse direction.

Sagittal Plane: As used in this disclosure, the sagittal plane refers to a reference plane that bisects a left side surface and right side surface such that the sagittal plane contains the line of the coronal direction and the line of the sagittal direction. The sagittal plane is perpendicular to the coronal plane and the transverse plane.

Shock absorber: As used in this disclosure, a shock absorber is a telescopic composite prism structure. The telescopic nature of the shock absorber allows the span of the length of the composite prism structure of the shock absorber to be adjusted.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tool: As used in this disclosure, a tool is a device, an apparatus, or an instrument that is used to carry out an activity, operation, or procedure. A tool generally comprises a working element and a handle. The handle of a tool that forms a sub-component of a larger structure is referred to as a mount.

Transverse Direction: As used in this disclosure, the transverse direction runs from the anterior surface to the posterior surface of an object and is perpendicular to the coronal direction and the sagittal direction Transverse Plane: As used in this disclosure, the transverse plane refers to a reference plane that bisects a superior surface and inferior surface such that the transverse plane contains the line of the transverse direction and the line of the transverse direction. The transverse plane is perpendicular to the coronal plane and the sagittal plane.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Weapon: As used in this disclosure, a weapon is a tool that is used to gain an advantage in a conflict. The term weapon is often assumed to be a tool that is used to injure or kill a biological entity.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A handgun safe comprising
a safe structure, a shock absorber structure, and a control circuit;
wherein the safe structure forms the exterior surfaces of a protected space formed by the handgun safe;
wherein the shock absorber structure mounts inside the safe structure;
wherein the control circuit mounts on the safe structure;
wherein the safe structure rotates between a closed position and an open position;
wherein the shock absorber structure comprises a plurality of shock absorbers and a plurality of stabilizer bars;
wherein the safe structure comprises a pan structure, a lid structure, a hinge structure;
wherein the plurality of shock absorbers provide the motive forces that move a holster structure along a holster track as the lid structure rotates into the open position;
wherein the holster track extends from a back of the lid structure to a front of the lid structure, and is responsible for holstering a firearm;
wherein the rotations of the plurality of shock absorbers are established such that: a) the rotation of the lid structure from the closed position to the open position allows the plurality of shock absorbers to push the holster structure along the holster track in the anterior direction such that the holster structure is configured to push a grip of the firearm into a hand of an end user in rapid succession in a safe manner; and, b) the rotation of the lid structure from the open position to the closed position is accomplished by pushing the firearm and the holster structure towards the rear of the safe structure, and by also pushing down on the lid structure.

2. The handgun safe according to claim 1
wherein the shock absorber structure rotates the safe structure;
wherein the control circuit controls the operation of the shock absorber structure;
wherein the control circuit controls access into the protected space formed by the safe structure.

3. The handgun safe according to claim 2
wherein the safe structure is a container;
wherein the safe structure is a hollow structure;
wherein the safe structure is a rigid structure.

4. The handgun safe according to claim 3
wherein the shock absorber structure is a mechanical structure;
wherein the control circuit controls the operation of the shock absorber structure;
wherein the shock absorber structure provides the motive forces that rotate the lid structure of the safe structure into the open position;
wherein returning the lid structure to the closed position is accomplished by pushing against the plurality of shock absorbers by pushing the firearm and holster structure towards the rear of the safe structure, and then by also pushing down on the lid structure;
wherein the shock absorber structure is contained within the protected space formed by the safe structure.

5. The handgun safe according to claim 4
wherein the control circuit is an electric circuit;
wherein the control circuit locks the lid structure into a closed position relative to the pan structure;
wherein the control circuit is a biometric structure;

wherein by biometric structure is meant that the control circuit performs a biometric scan on an individual trying to access the protected space of the safe structure;

wherein the biometric structure is located along a center of the lid such that the firearm is aligned with the biometric structure such that as the firearm and holster structure extends out of the safe structure, the firearm is adapted to align with the hand of the end user in order to efficiently draw the firearm in rapid succession;

wherein the control circuit determines whether the performed biometric scan matches an individual authorized to access the protected space of the safe structure;

wherein the control circuit allows appropriate access to the protected space of the safe structure;

wherein the control circuit unlocks the shock absorber structure, which enables the shock absorber structure to rotate the lid structure into the open position.

6. The handgun safe according to claim 5
wherein the pan structure forms a portion of the boundary of the protected space of the safe structure;
wherein the pan structure is a hollow structure;
wherein the pan structure is a pan shaped structure;
wherein the shock absorber structure and a portion of the control circuit are contained within the pan structure;
wherein the lid structure forms a portion of the boundary of the protected space of the safe structure;
wherein the lid structure is geometrically similar to the open face of the pan structure;
wherein the lid structure rotates relative to the pan structure;
wherein the lid structure rotates between the closed position and the open position;
wherein in the closed position, the lid structure encloses the open face of the pan structure such that the protected space of the safe structure is enclosed;
wherein in the open position, the lid structure rotates away from the open face of the pan structure such that the protected space of the safe structure is accessible;
wherein the hinge structure is a rotating structure;
wherein the hinge structure attaches the lid structure to the pan structure such that the lid structure rotates relative to the pan structure;
wherein the axis of rotation of the lid structure aligns with the axis of rotation of the hinge structure;
wherein the hinge structure fastens the pan structure to the lid structure;
wherein the holster structure rides on the track that permanently mounts on the interior surface of a disk structure;
wherein the holster structure is fully contained and locked within the protected space of the safe structure when the lid structure rotates into the closed position.

7. The handgun safe according to claim 6
wherein the plurality of shock absorbers provide the motive forces necessary to rotate the lid structure into the open position;
wherein the plurality of shock absorbers is four.

8. The handgun safe according to claim 7
wherein a first congruent end of two of the four shock absorbers of the plurality of shock absorbers attaches to the interior surface of the pan structure;
wherein a second congruent end of two of the four shock absorbers of the plurality of shock absorbers attaches to the holster structure;
wherein the second set of plurality of shock absorbers, the first end of the shock absorbers attaches to the pan structure, wherein the second end of the two shock absorbers attaches to the disk structure;
wherein each selected shock absorber is under pressure;
wherein each selected shock absorber converts the pressure of a pressurized fluid into a motive force that rotates the lid structure into the open position;
wherein the plurality of shock absorbers combine to provide the motive forces that hold the lid structure in the open position.

9. The handgun safe according to claim 8
wherein a first congruent end of each selected stabilizer bar attaches to the interior surface of the pan structure such that the selected stabilizer bar rotates relative to the pan structure;
wherein a second congruent end of each selected stabilizer bar permanently attaches to a side surface of the holster structure;
wherein the second congruent end of each selected stabilizer bar attaches to the surface of the holster structure such that the selected stabilizer bar rotates relative to the holster structure.

10. The handgun safe according to claim 9
wherein the control circuit comprises a logic circuit, a fingerprint scanner, an electronic lock structure, and a GPS module;
wherein the logic circuit, the fingerprint scanner, the electronic lock structure, and the GPS module are electrically interconnected;
wherein the electronic lock structure is a manual key, and is included in order to bypass use of the fingerprint scanner.

11. The handgun safe according to claim 10
wherein the logic circuit is an electric circuit;
wherein the logic circuit controls the operation of the control circuit;
wherein the logic circuit electrically connects to the fingerprint scanner;
wherein the logic circuit monitors the operation of the fingerprint scanner;
wherein the logic circuit electrically connects to the electronic lock structure;
wherein the logic circuit controls the operation of the electronic lock structure;
wherein the GPS module tracks the GPS coordinates of the handgun safe.

* * * * *